United States Patent [19]

Krishnakumar et al.

[11] Patent Number: 4,710,118
[45] Date of Patent: Dec. 1, 1987

[54] APPARATUS FOR FORMING PREFORMS WITH INTERNAL BARRIER

[75] Inventors: Suppayan M. Krishnakumar, Nashua; Thomas E. Nahill, Salem, both of N.H.

[73] Assignee: Continental PET Technologies, Inc., Stamford, Conn.

[21] Appl. No.: 861,854

[22] Filed: May 12, 1986

Related U.S. Application Data

[63] Continuation-in-part of Ser. No. 581,409, Feb. 17, 1984, Pat. No. 4,609,516.

[51] Int. Cl.⁴ ............................................. B29C 31/06
[52] U.S. Cl. .................................. 425/130; 425/533; 425/566
[58] Field of Search ............... 425/130, 523, 533, 562, 425/564, 566

[56] References Cited

U.S. PATENT DOCUMENTS

| | | | |
|---|---|---|---|
| 3,023,461 | 3/1962 | Sherman | 425/523 |
| 3,733,156 | 5/1973 | Garner | 425/130 |
| 3,888,612 | 6/1975 | Schrewe et al. | 425/130 |
| 3,979,170 | 9/1976 | Monnet | 425/130 |
| 4,117,955 | 10/1978 | Sokolow | 425/130 |
| 4,373,886 | 2/1983 | Hehl | 425/562 |
| 4,525,134 | 6/1985 | McHenry et al. | 425/130 |

FOREIGN PATENT DOCUMENTS

| | | | |
|---|---|---|---|
| 56-106839 | 8/1981 | Japan | 425/130 |
| 1389751 | 9/1975 | United Kingdom | 425/130 |
| 2091629 | 8/1982 | United Kingdom | |

Primary Examiner—Tim Miles
Attorney, Agent, or Firm—Charles E. Brown

[57] ABSTRACT

This relates to laminated preforms, the method of forming such preforms and products which may be beneficially formed utilizing such preforms. Most particularly, this relates to a preform which has formed as part of the injection molding thereof two layers of barrier material which are disposed within two layers of thermoplastic resin and having received therebetween a solid core of thermoplastic resin. The specific method of forming the preform permits the barrier material layers to be of a greatly reduced thickness as compared to such layer thicknesses permissible in the past, with the result that the barrier material layers in the blow molded articles are of a thickness recognized to be acceptable for the barrier function. The barrier material layers may be selectively terminated along the length of the preform so as to permit portions of the resultant blow molded article to be removed and reused. This abstract is not to be construed as limiting the claims of the application.

11 Claims, 21 Drawing Figures

APPARATUS FOR FORMING PREFORMS WITH INTERNAL BARRIER

This application is a continuation-in-part of our co-pending Application Ser. No. 581,409, filed Feb. 17, 1984, and now U.S. Pat. No. 4,609,516, granted Sept. 2, 1986.

This invention relates in general to new and useful improvements in preforms formed by injection molding thermoplastic materials and which preforms are utilized in the forming of blow molded articles.

This invention particularly relates to the forming of a preform of a thermoplastic material having incorporated therein a layer of barrier material.

Currently multi-layer containers are produced commercially utilizing the following methods of processing:
 a. Coextrusion blow molding
 b. Coextrusion stretch blow molding
 c. Tube coextrusion and reheat stretch blow molding
 d. Sequential injection molding of preforms in multi-station injection molds and stretch blow molding.

Among the methods listed above, method "d" is the only one which yields finished cold multi-layer preforms. But this method is still not practical for producing multi-layer preforms with one of the layers having a thickness of 0.003 to 0.015 inch.

There has been developed a method of forming a preform by injection molding wherein there is incorporated therein a central layer of barrier material. This is disclosed in U.K. patent application No. 2091629A. However, because of the cost of the barrier material, the thickness of the barrier layer which is possible in accordance with that patent application is too great to be commercially feasible.

Barrier materials which are suitable for use in the forming of containers have 2 to 3 magnitudes higher gas barrier and are 4 to 8 times more expensive when compared to thermoplastic materials suitable for use in the forming of containers. The thickness of the barrier layer required in a container wall for the majority of the packaging applications is on the order of 0.0005 to 0.0015 inch. This would, assuming a 10 times wall thickness reduction during the biaxial orientation of blow molding a preform, translates to a 0.005 to 0.015 inch layer thickness of the barrier material in the wall of a multi-layer preform.

This invention in particular relates to the forming of a multi-layer preform which has five layers including inner and outer first layers of thermoplastic resin, inner and outer second layers of barrier material within the first layers and a central or second layer of thermoplastic material between the layers of barrier material. Further, the sums of the thicknesses of the two layers of barrier material may be as low as 0.006 inch.

In accordance with this invention, one takes advantage of mold filling phenomenon which comprises:
1. Laminar flow
2. The development of elongational and shear fields in the advancing melt front between two parallel cold walls
3. The formation of oriented solidified layers on the cold wall and the tunnel flow of molten material between the solidified layers.

A further feature of this invention is the ability to provide two very thin barrier layers instead of one thick layer and the advantages resulting therefrom.

The central layer of thermoplastic material may either be the same as the inner and outer first layers of thermoplastic resin or may be different. Most particularly, it is envisioned that the central layer may be in the form of a regrind which is primarily a thermoplastic resin, but may contain minute quantities of other materials including a barrier material.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
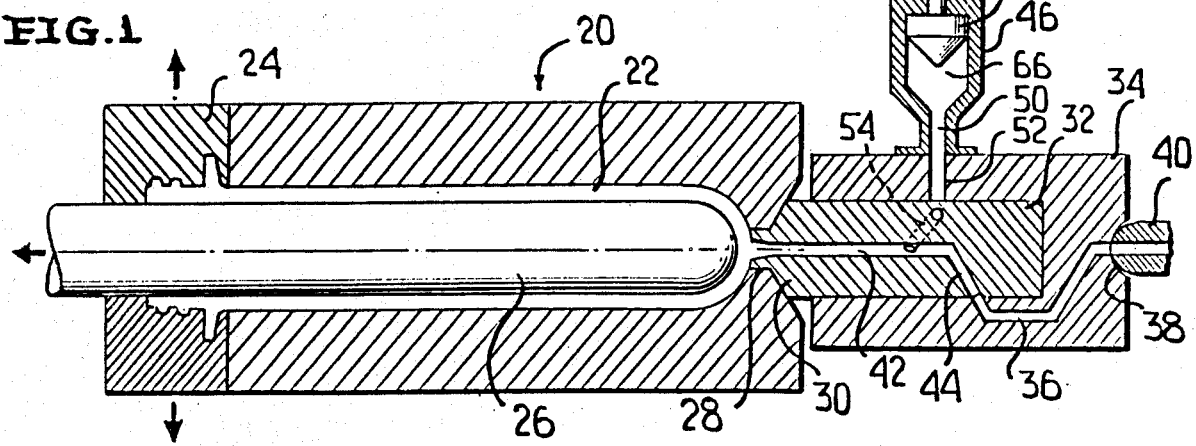
FIG. 1 is a schematic sectional view taken through one injection mold cavity, and shows the manner in which material is directed into the cavity to form a preform in accordance with this invention.

Referring now to the drawings in detail, it will be seen that there is illustrated in FIG. 1 a conventional injection mold generally identified by the numeral 20. It is to be understood that this is a schematic showing that a conventional injection mold for forming a preform will include numerous cavities, for example sixteen or more, arranged in rows and columns. Such an injection mold is generally of a solid construction and each injection mold unit will include a mold cavity 22. Each mold unit 20 will also include a neck ring 24 which forms an extension of the mold cavity 22 and defines a neck finish. The neck ring 24 may be of a split construction. Further, each mold unit 20 is provided with a core 26.

It will be seen that the neck ring 24 in conjunction with the core 26 closes what may be considered to be the upper end of the mold cavity 22 while the lower end of the mold cavity is provided with an opening 28 which may receive in sealed relation the nozzle of an extruder.

In accordance with the present invention, in lieu of the nozzle of the extruder being directly received within the opening 28, a nozzle-like end 30 of a rotary valve member 32 is received in the opening 28 in sealed relation. The valve member 32 is mounted in sealed relation within a valve block 34 which has formed therein a first passage 36 which receives the conventional nozzle 40 of a plasticizer or injection head. The passage 36 opens radially toward the rotary valve member 32. The rotary valve member 32 has a through passage 42 which at one end terminates in a generally radial passage 44 which can be aligned with the passage 36. There is also associated with the valve block 34 a second material dispenser 46 which in its simplest form may include a dispensing piston 48 and which has a flow passage 50 exiting therefrom toward the valve block 34. The valve block 34 has a radial passage 52 which is axially aligned with and in communication with the passage 50. The passage 52 terminates at the valve member 32. The valve member 32 has a further passage 54 extending generally radially from the passage 42 and so circumferentially spaced from the passage 44 such that when the passage 44 is aligned with the passage 36 the passage 54 is spaced from the passage 52 in a circumferential direction by rotating the valve member 32, the passage 44 may be moved out of communication with the passage 36 and the passaage 54 moved into communication with the passage 52. Thus material may be selectively supplied from either the plasticizer or from the supply device 46.

In accordance with this invention, the material delivered by the plasticizer will be a suitable thermoplastic resin in the form of a hot melt. This resin may be such materials as PET, PP, PE, PVC and PC. The barrier material which is supplied by the supply device 46 may be of any conventional known barrier material including, for example, EVAL, EVOH, PVOH and the like, or such barrier materials as may be developed in the future.

With respect to the foregoing, it is to be noted that EVAL has barrier properties on the order of one hundred times that of PET; EVOH has barrier properties on the order of one hundred to two hundred times that of PET: and PVOH has barrier properties on the order of two thousand times that of PET. Accordingly, only a very thin layer of these barrier materials is required, and from a commercial standpoint it is highly desirable to maintain such very thin layers because of the much higher cost of the barrier materials than the acceptable thermoplastic resins including PET.

It is also to be understood that the external thermoplastic resin layers must be of sufficient thickness to protect the barrier layer. On the other hand, in the case of a bottle for beverages or other products containing $CO_2$, the innermost layer of the thermoplastic material, i.e. that which defines the interior of the container, must be relatively thin so as not to absorb $CO_2$.

With the foregoing requirements in mind, the manner in which a laminated preform is formed in accordance with this invention will be described in detail.

Figure 2:
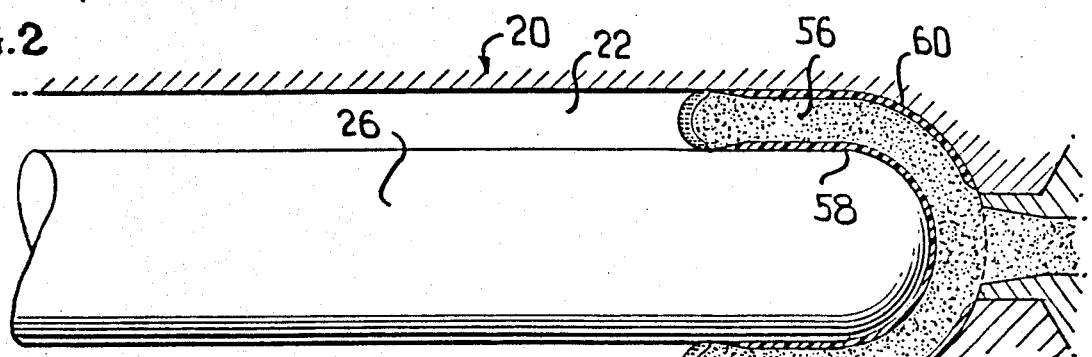
FIG. 2 is an enlarged fragmentary schematic view showing the manner in which a first quantity of thermoplastic resin is injected into the bottom of the mold cavity and the resultant cooling upon contact with cold wall surfaces.

Referring first to FIG. 2, it will be seen that a preselected limited amount of a first thermoplastic resin 56 will be injected into the bottom of the mold cavity 22 and as it flows through the mold cavity, due to the relatively cool temperature of the mold unit 20 including the core 26, there will be solidification of the thermoplastic resin 56 both externally and internally of the mold cavity 22 to define inner and outer layers 58, 60 of the first thermoplastic resin.

Figure 5:
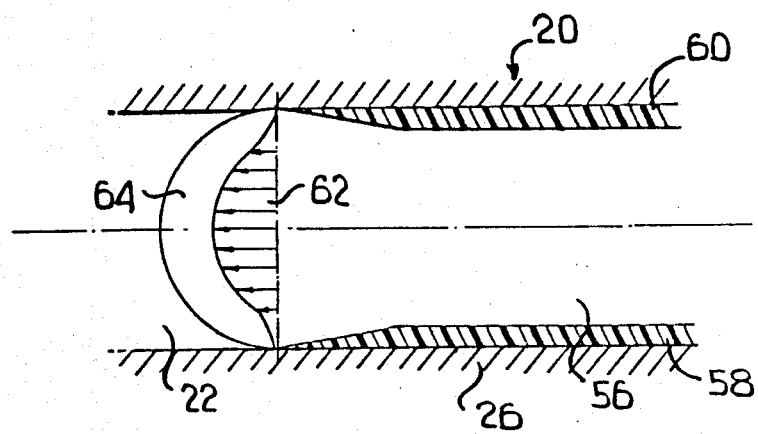
FIG. 5 is an enlarged fragmentary radial sectional view showing the flow of the thermoplastic material forming the first layers of the laminated preform.

Reference is particularly made to FIG. 5 at this time wherein it will be seen that the thermoplastic resin 56 has a laminar flow with the velocity of the advancing thermoplastic resin being the greatest in the center and diminishing toward zero adjacent the mold components. The velocity of the advancing thermoplastic resin 56 is generally indicated by an arrow schematic arrangement 62. It is to be understood that as the thermoplastic resin 56 solidifies upon contacting the mold components, the flow of the thermoplastic resin will discontinue adjacent the walls of the mold cavity 22 and there will be a tunnel flow effect between the layers 58, 60. Further, due to the relatively cool air within the mold cavity 22, there will be a slight cooling of the advancing front of the thermoplastic resin 56, which front is identified by the numeral 64.

It is to be understood that the thickness of the layers 56, 60 will be varied depending upon factors such as:

1. Material properties (viscoelastic and thermal)
2. Cavity dimensions
3. Injection velocity (pressure)

Figure 6:
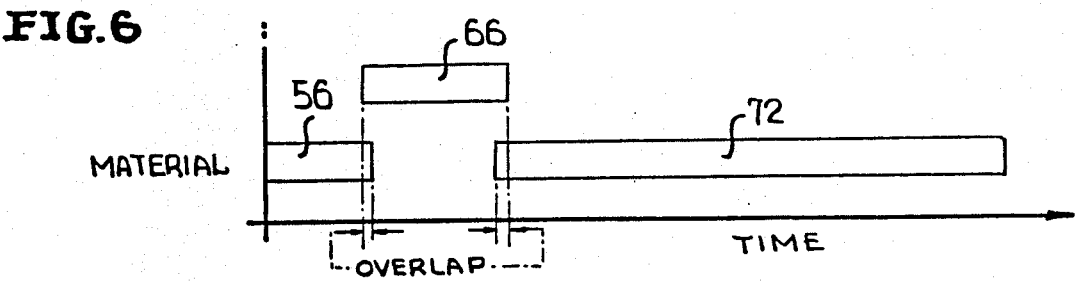
FIG. 6 is a diagram plotting the injection of the materials into the mold cavity against time.
Figure 7:
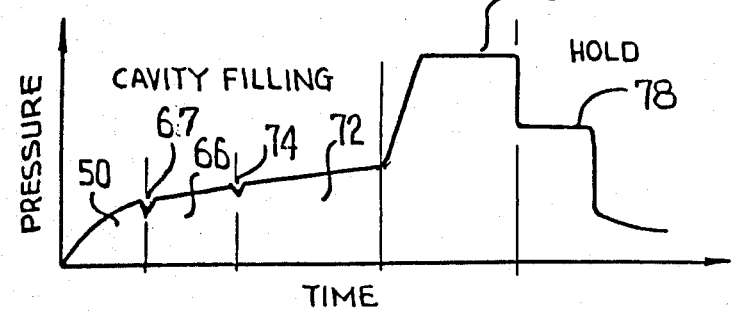
FIG. 7 is another diagram plotting pressure within the mold cavity against time.

It is to be understood that a precise amount of the first thermoplastic resin 56 will be injected into the mold cavity 22 over a selected period of time, with this being schematically shown in FIG. 6, and at a low pressure as indicated in FIG. 7. The quantity of the thermoplastic resin which is injected into the mold cavity may be controlled in many conventional manners. Basically, injection of the thermoplastic resin is effected by axially advancing the feed screw of a plasticizer, and a suitable stop may be provided to limit the advance of the feed screw. There also will be the timed rotation of the valve member 32 to move the passage 44 out of alignment with the passage 36 and thus the quantity of thermoplastic resin 56 injected into the mold cavity 22 may be controlled by the timing of the actuation of the valve member 32.

As is schematically shown in FIG. 6, the barrier material which is next injected into the mold cavity and is identified by the numeral 66, is fed towards the mold cavity in slightly overlapping relation with respect to the thermoplastic resin 56. It is to be understood that the mechanism for feeding the barrier material 66, as schematically shown in FIG. 1, may be of a single shot type so as to inject the exact amount of barrier material required.

With respect to FIG. 7, it will be seen that the barrier material 66 will be injected into the mold cavity 22 by a pressure only slightly higher than the pressure of the thermoplastic resin 56 with there being a very slight pressure drop as at 67 between the discontinuation of injecting the thermoplastic resin 56 and the initiation of the injection of the barrier material 66. The overlap in injection is to keep the pressure drop to a minimum.

Figure 3:
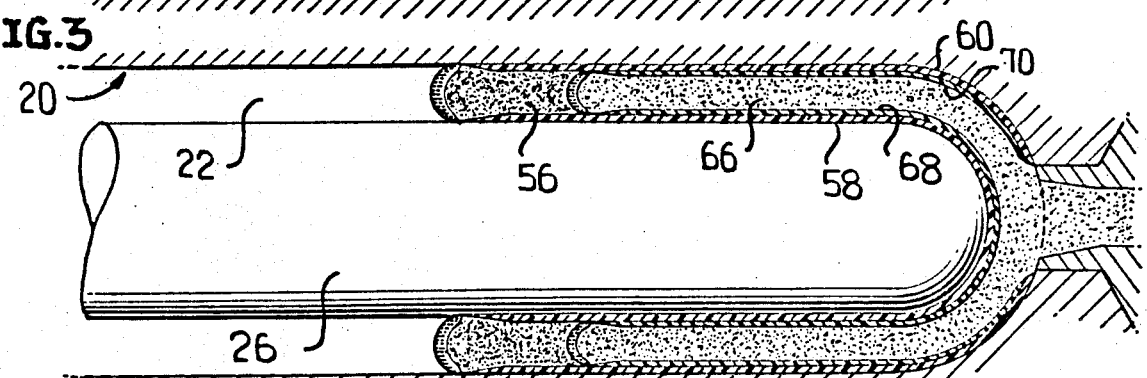
FIG. 3 is a schematic sectional view similar to FIG. 2, and shows the injection of a barrier material into the bottom of the mold cavity and the resultant tunnel flow of both the first quantity of thermoplastic resin and the barrier material.

Referring now to FIG. 3, it will be seen that the barrier material 66 will have a tunnel flow through the cavity defined between the layers 58, 60 and at the same time will advance the previously injected thermoplastic material 56. Normally the barrier material will have a lower melting temperature than the thermoplastic resin 56, and therefore the cooling effect of the thermoplastic resin layers 58, 60 on the barrier material 66 will not be as great as the mold surfaces on the thermoplastic material 56. Thus, while there will be a solidifcation of the barrier material 66 as it contacts the solidified layers 58, 60 and there will be formed inner and outer solidified layers 68, 70 of the barrier material, these layers will be materially thinner than the layers 58, 60. For example, the layers 58, 60 will have a thickness varying from 0.010 to 0.040 inch, while the barrier material layers 68, 70 will have a thickness as low as 0.003 inch.

Figure 4:
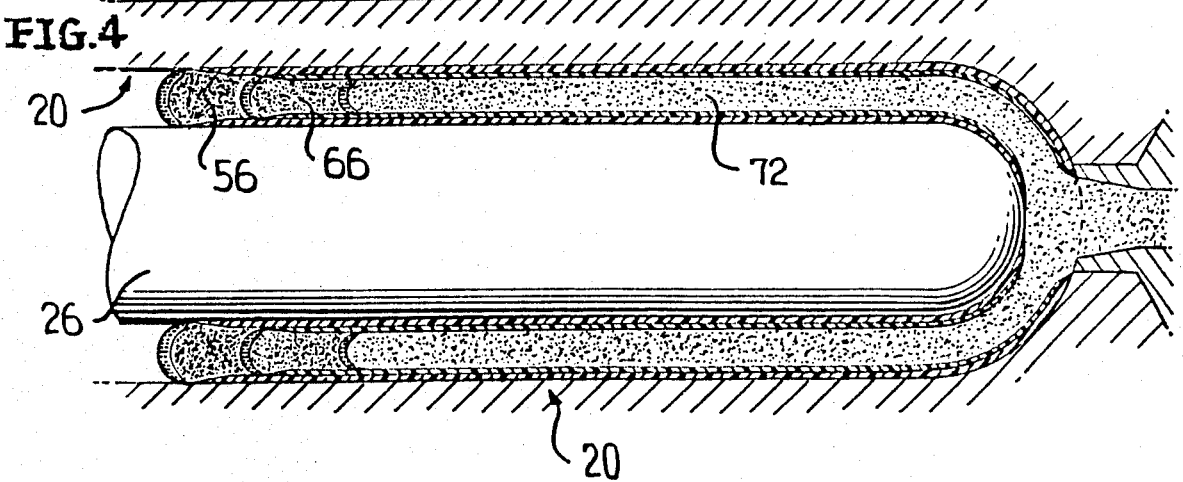
FIG. 4 is a schematic fragmentary sectional view similar to FIGS. 2 and 3, and shows the progressive flow of a second quantity of thermoplastic resin into and through the layers of the first thermoplastic resin and the barrier material.

Referring now to FIG. 4, in the illustrated embodiment of the mechanism for feeding the thermoplastic resin, an additional supply of the same thermoplastic resin identified by the numeral 56 is injected into the mold cavity. This additional supply of thermoplastic resin is generally identified by the numeral 72. The thermoplastic resin 72 as it advances within the confines of the layers 68, 70 of the barrier material will re-melt the barrier material and advance it together with the barrier material melt 66 through the tunnel defined by the layers 68, 70, thereby reducing the thickness of the layers 68, 70. As will be apparent from FIG. 4, the advancing thermoplastic resin 72 will advance the barrier material 66 which, in turn, will continue to advance the thermoplastic resin 56.

Further with respect to FIG. 4, it will be seen that the advancing large quantity of the thermoplastic resin 72 as it engages the layers 58, 68 at the end of the core 26, will melt portions of the solidified layers 58, 68 and advance the same with the result that there may be no portion of either the layer 58 or the layer 68 at the extreme end of the core 26.

Referring next to FIG. 6, it will be seen that the thermoplastic resin 72 is advanced in slightly overlapping relation with the barrier material 66. It is to be understood that once the injection of the barrier material 66 has been completed the valve member 32 will be rotated to a position to receive the thermoplastic resin 72. In the illustrated embodiment, the valve member 32 will be returned to its starting position since the thermoplastic resin 72 is delivered from the same supply as the thermoplastic resin 56.

With respect to the diagram of FIG. 7, it will be seen that the thermoplastic resin 72 will be injected first at a gradually increasing pressure above the pressure of the injection of the barrier material 66 with a slight initial pressure drop, as indicated at 74. Then, when the cavity 22 has been filled, there will be a pressure boost, as at 76, followed by a holding period 78 wherein the pressure of the hot melt material injected into the mold cavity will gradually decrease as the thermoplastic material 72 gradually solidifies.

Depending upon usage of the preform which is formed in the manner described above, the amount of the thermoplastic resin 56 and the barrier material 66 injected into the mold cavity 22 will vary. Further, the shape of the preform at the front end thereof will vary.

Figure 8:
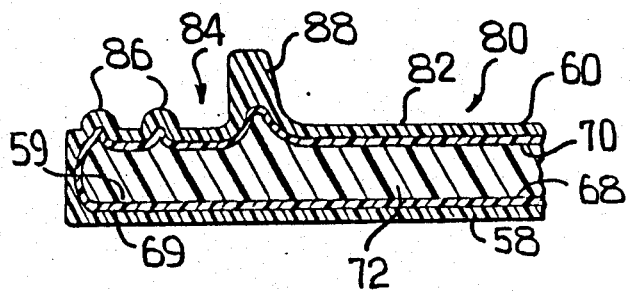
FIG. 8 is an enlarged radial sectional view through the neck finish end of a preform in accordance with this invention for forming a blow molded bottle, and shows one arrangement of material layers within the preform.
Figure 9:
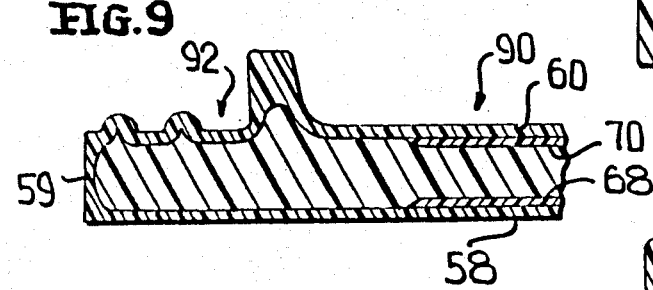
FIG. 9 is a fragmentary sectional view similar to FIG. 8, but showing another relationship of the material layers in the area of the neck finish.
Figure 10:
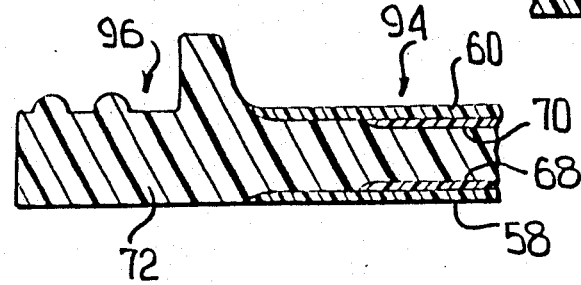
FIG. 10 is yet another enlarged fragmentary sectional view similar to FIG. 8, and shows yet another arrangement of the material layers within the preform.

In FIGS. 8, 9 and 10, there are illustrated preforms which are particularly adapted to be used in their entireties in the blow molding of bottles and like containers wherein a small diameter closure is applied by means of screw threads.

With respect to FIG. 8, the illustrated preform portion is part of a preform identified by the numeral 80 and includes a laminated body 82 which terminates in a neck finish generally identified by the numeral 84. The neck finish 84 includes injection molded threads 86 and a shoulder member 88 by means of which the preform 80 is supported during reheating and blow molding.

In the preform 80, the quantity of thermoplastic resin 56 injected into the mold cavity is sufficient to have the layers 58, 60 extend to the extreme end of the preform 80 and to form at the extreme end an end wall 59. Further, the quantity of barrier material injected into the mold cavity is sufficient to have the layers 68, 70 extend to a point adjacent the extreme end of the preform and to form an end wall 69 adjacent the end wall 59. The thermoplastic resin 72 will also extend to a point adjacent the extreme end of the preform 80 as permitted by the end wall 69.

In FIG. 9 there is illustrated a preform 90 which will be of the same configuration as the preform 80. Further, while the quantity of the thermoplastic resin 56 directed into the mold cavity will be sufficient for the layers 58, 60 to go to the extreme end of the preform including a neck finish portion 92 thereof and to form the end wall, the quantity of the barrier material 66 injected into the mold cavity will be such that the layers 68, 70 will terminate interiorly of the preform short of the neck finish 92 into that area of the resultant bottle which becomes the shoulder of the bottle, as will be described in detail hereinafter.

With respect to FIG. 10, the preform 94 thereof is also of an identical configuration to the preform 80. However, the quantity of the thermoplastic resin 56 introduced into the mold cavity will be only sufficient for the layers 58, 60 to extend to a point adjacent to the neck finish 96 of the preform 94. Thus, the neck finish part of the preform 94 will be formed solely by the thermoplastic resin 72. Further, the quantity of the barrier material 66 injected into the mold cavity will be such that the layers 68, 70 terminate internally of the preform short of the termination of the layers 58, 60.

Figure 11:
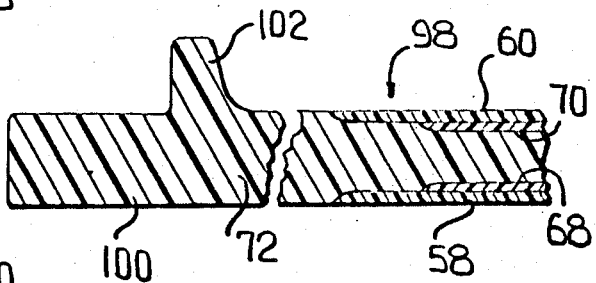
FIG. 11 is an enlarged fragmentary sectional view similar to FIG. 8, but through a slightly different type of preform, and shows the arrangement of the layers therein.
Figure 12:
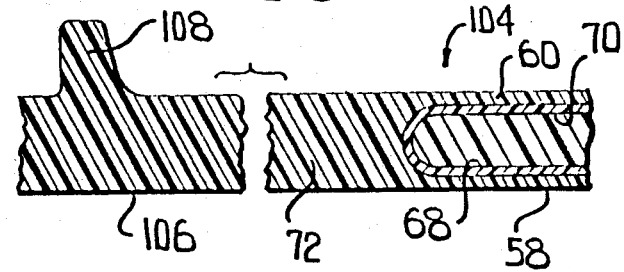
FIG. 12 is yet another enlarged fragmentary sectional view similar to FIG. 8, but with respect to a preform of the type shown in FIG. 11 and showing yet another arrangement of material layers.

In FIGS. 11 and 12 there are illustrated preforms for forming containers and like hollow articles other than bottles or containers with small diameter neck finishes. An extreme end portion only in radial section of such preform is illustrated in each of FIGS. 11 and 12.

With particular reference to FIG. 11, it will be seen that there is illustrated a preform 98 having an open end portion 100 which may include a supporting flange or collar 102. Inasmuch as the end portion 100, as will be described in detail hereinafter, is utilized solely as a support in the blow molding of the preform 98 into a tubular shape, it is not necessary that the barrier material 66 extend into the end portion 100. Therefore, only sufficient barrier material is injected into the mold cavity of the preform 98 so as to permit the layers 68, 70 to terminate adjacent the end portion 100. In a like manner, the quantity of thermoplastic resin 56 injected into the mold cavity will be only sufficient to have the layers 58, 60 extend generally into the area of the end portion 100. Thus the end portion 100 will be formed entirely by the thermoplastic resin 72.

In FIG. 12 there is illustrated yet another preform 104 which is identical to the preform 98 including an end portion 106 and a flange or collar 108, except that the end portion 106 is formed entirely by the thermoplastic resin 56 and the layers formed by the resins 66 and 72 terminate in relatively great spaced relation to the end portion 106. The preform 104 is advantageous in forming a container or like tubular body wherein an intermediate article of manufacture is involved.

Figure 13:
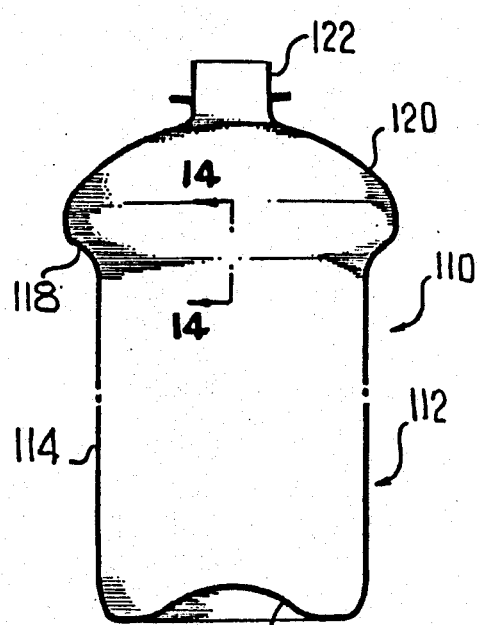
FIG. 13 is a vertical sectional view taken through an intermediate article of manufacture utilizing a preform such as that shown in FIGS. 11 and 12.

Referring now to FIG. 13, it will be seen that there is illustrated an intermediate article of manufacture generally identified by the numeral 110 and blow molded from a preform such as the preform 98 or the preform 104. The intermediate article of manufacture includes a base portion 112 in the form of a container. The base portion 112 includes a tubular body 114 having an integral bottom 116 and terminating in a closure receiving portion 118. The illustrated closure receiving portion 118 is in the form of a flange adapted to be engaged by a conventional metal end unit and forming part of a conventional double seam securing the metal end unit (not shown) to the base portion 112 which, when separated from the remainder of the intermediate article of manufacture 110, becomes a container.

Although it has not been so illustrated, the intermediate article of manufacture 110 may have the closure receiving portion 118 in the form of a neck finish which may be threaded or otherwise modified to receive a closure unit. At this time it is to be understood that except for the fact that it is formed from a laminated preform the intermediate article of manufacture 110 has been formed prior to this invention.

It will be seen that the intermediate article of manufacture also includes an upper blow molded portion 120 which terminates in an end portion 122 which will correspond to the end portions 100, 106 of the preform 98, 104.

Figure 14:
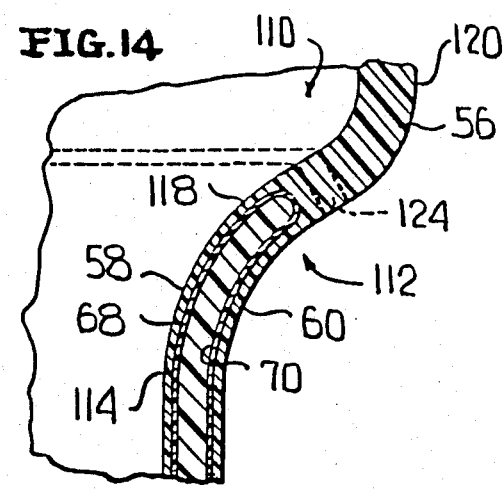
FIG. 14 is a fragmentary enlarged radial sectional view taken generally along the line 14—14 of FIG. 13, and shows the arrangement of the layers of material within the article.

With respect to FIG. 14, the intermediate article of manufacture illustrated therein was formed from a preform such as the preform 104 of FIG. 12. It is to be understood that the upper portion 120 is to be separated from the base portion 112 by a cutting action, such as a fusion cutting action, with the removal of a portion 124. It will be seen that in this embodiment of the invention the layers 68, 70 terminate in the closure receiving portion 118 and that the layer formed by the thermoplastic material 72 terminates entirely within the base portion 112. Thus all of the intermediate article of manufacture 110 which is to be severed from the base portion 112 will be formed by the thermoplastic resin 56 and may be reconditioned and reused.

Figure 15:
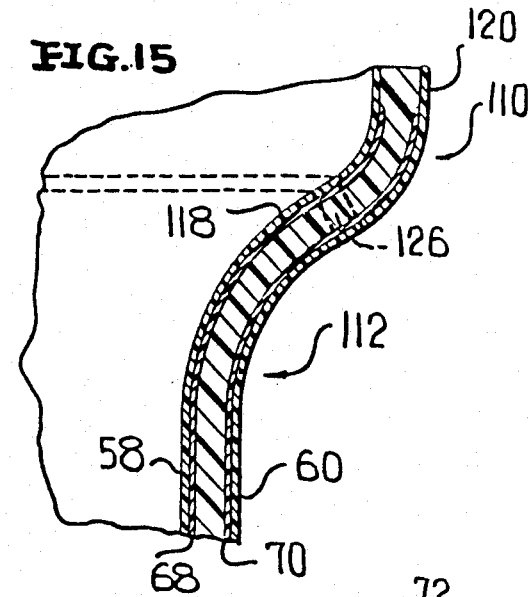
FIG. 15 is an enlarged fragmentary sectional view similar to FIG. 14, and shows a different arrangement of the material layers.

On the other hand, with respect to FIG. 15, there may be occasions where it is desired that the barrier material layers 68, 70 extend beyond the closure receiving portion 118 into the upper portion 120. Thus, when the base portion 112 is removed from the remainder of the intermediate article of manufacture 110, the layers 68, 70 of the barrier material will extend through the cut edge of the base portion 112 into the upper portion 120. In a like manner, the layers 58, 60 of the first thermoplastic resin will also extend into the upper portion 120. Thus, when the base portion 112 is severed from the remainder of the intermediate article of manufacture 110 by removal of the material in the area 126, the intermediate of manufacture 110 illustrated in FIG. 15 may be formed, for example, from the preform of FIG. 11. When the cutting action involves heat fusion of the cut layers to one another may be effected at the end of the base portion 120.

Figure 16:
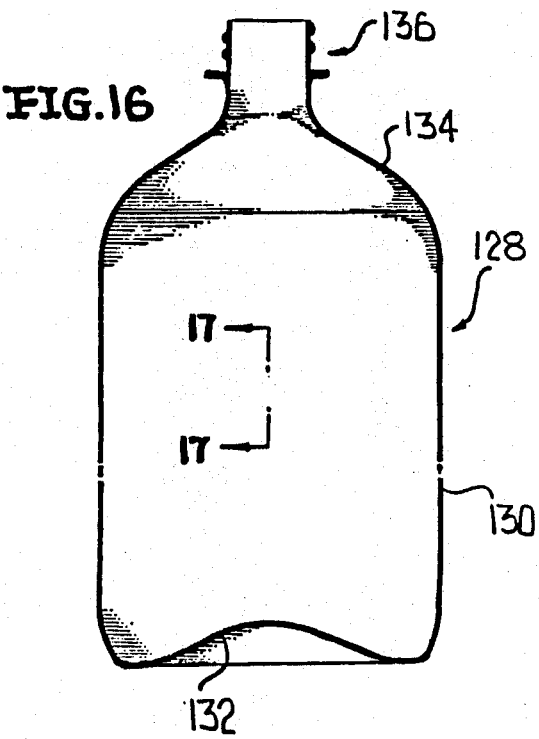
FIG. 16 is a vertical sectional view taken through a bottle or like container formed utilizing one of the preforms of FIGS. 8–10.

In FIG. 16 there is illustrated a conventional bottle which may be formed from any one of the preforms of FIGS. 8, 9 and 10. The bottle is generally identified by the numeral 128 and includes a tubular body 130 having an integral bottom 132. The body 130 at its upper end is connected by way of a shoulder 134 to a neck finish 136.

It is to be understood that the neck finish 136 will be identical to the neck finish of the respective preform from which the bottle 128 is blow molded. Further, it will be seen that the termination of the layers 68, 70 of the barrier material may be at the extreme end of the neck finish 136 when the preform of FIG. 8 is utilized. On the other hand, when the preform of FIG. 9 is utilized, the layers 68, 70 of the barrier material will terminate in the shoulder 134 adjacent the neck finish 136. Finally with respect to the use of the preform of FIG. 10, both the layers 68, 70 of the barrier material and the layers 58, 60 of the first thermoplastic resin will terminate in the shoulder 134 adjacent the neck finish 136.

With particular reference to the bottle 128, it is to be understood that in the normal blow molding of such bottle the body portion 130 will be very thin, having been reduced in thickness on the order of one-tenth or less so that the material forming the body 130 will have a positive and desired biaxial orientation. On the other hand, the material of the bottle 128 in the shoulder 134 closely adjacent the neck finish 136 will have only a minor reduction in thickness while the material in the neck finish 136 will not be reduced in thickness at all. Thus the barrier material 66 may beneficially terminate in the shoulder 134 as described above.

It is also pointed out here that the extreme center of the bottom 132 is of a much greater thickness than the body 130, and therefore the absence of barrier material in the central part of the bottom 132 will not be a material omission.

Figure 17:
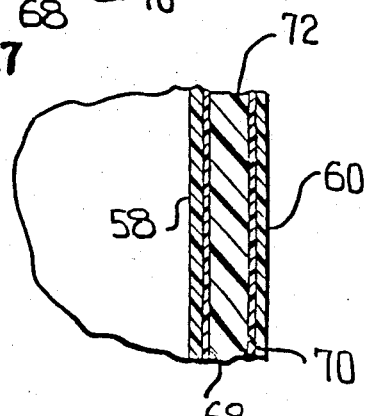
FIG. 17 is an enlarged fragmentary radial sectional view taken generally along the line 17—17 of FIG. 16, and shows the relationship of layers of material in the finished bottle.

Reference is finally made to FIG. 17 which is a radial cross section of the body 130 and shows inner and outer layers 58, 60 of the first thermoplastic material 56, inner and outer layers 68, 70 of the barrier material 66, and a central core of the other thermoplastic material 72. Inasmuch as there is a reduction in thickness of the laminated preform on the order of ten times, the thickness of the layers 58, 60 in the bottle 128 will be on the order of 0.001 to 0.004 inch, while the thickness of the barrier material layers 68, 70 will be on the order of 0.0003 inch. The thickness of the layer 58 will be sufficient to protect the barrier layer 68 against the contents of the bottle 128 including available $CO_2$.

Further, it has been found that when the barrier material 66 does not have properties which permit the heat bonding thereof to the thermoplastic resin and the thickness of the layers 68, 70 have been relatively great as required by known practices, when the blow molded article has been formed there has been a positive delamination of the layers of barrier material from the remainder of the blow molded article. However, when the barrier material layers in the preform are very thin, as described hereinabove, it has been found that the prior pronounced delamination does not occur. A conventional test for delamination is the squeezing of the body of a blow molded article, and if there is delamination there will be a squeaking noise emitted. When the barrier material layers are very thin at the start, the blow molded articles utilizing such a preform do not emit the squeaking noise and do not show evidence of a complete delamination.

There has recently been developed by others a five-layer tubular parison which is formed as an extruded tube. Such parison does have a barrier layer which is thin, but which is not directly bonded to the thermoplastic resins which form the primary layers of the parison. The method of forming such a multi-layer parison is not conducive to the diffusion bonding of a barrier layer to a conventional thermoplastic resin layer by way of pressure when the materials of the two layers are not normally heat bondable together in that the components of such a tubular parison are extruded at a low pressure on the order of 2000 to 5000 p.s.i. and as soon as the tube leaves the extrusion head, at which time all components are hot, the pressure is relieved and as the components cool they shrink and tend to separate.

On the other hand, as is schematically shown in FIG. 7, when the various materials are introduced into the mold cavity 22 by a conventional injection molding process, the barrier layers 68, 70, in addition to being very thin and thus relatively incompressible, are clamped between the core 72 and the layers 58, 60 at a very high pressure on the order of 15,000 to 17,000 p.s.i. Therefore, while the barrier layers 68, 70 may not be heat bondable to the thermoplastic resin layers 58, 60 and the core 72, there is a considerable diffusion bonding effected between these layers at the high forming temperatures and pressures. Further, as is also shown in FIG. 7, after the injection step has been completed there is a maintaining of a high pressure on the materials previously injected into the mold cavity and thus the pressure is maintained between the layers as the materials of the layers shrink, thereby preventing any tendency to separate due to relative shrinkage.

Since the thickness of the barrier layers 68, 70 may be as low as 0.003 inch, it will be apparent that it is of a relatively incompressible thinness. Further, as disclosed hereinbefore, the preform, at least in the body portion of the resultant blow molded hollow member, will be stretched on the order of ten times, thereby reducing the thickness of the barrier layers 68, 70 to be as low as 0.0003 inch, which thinness results in the resultant barrier layers as being extremely thin and thus incompressible for all practical purposes. The net result is that in the resultant blow molded hollow member the barrier layers 68, 70 maintain a pressure bond with the thermoplastic resin layers 58, 60 and the core 72.

Figure 18:
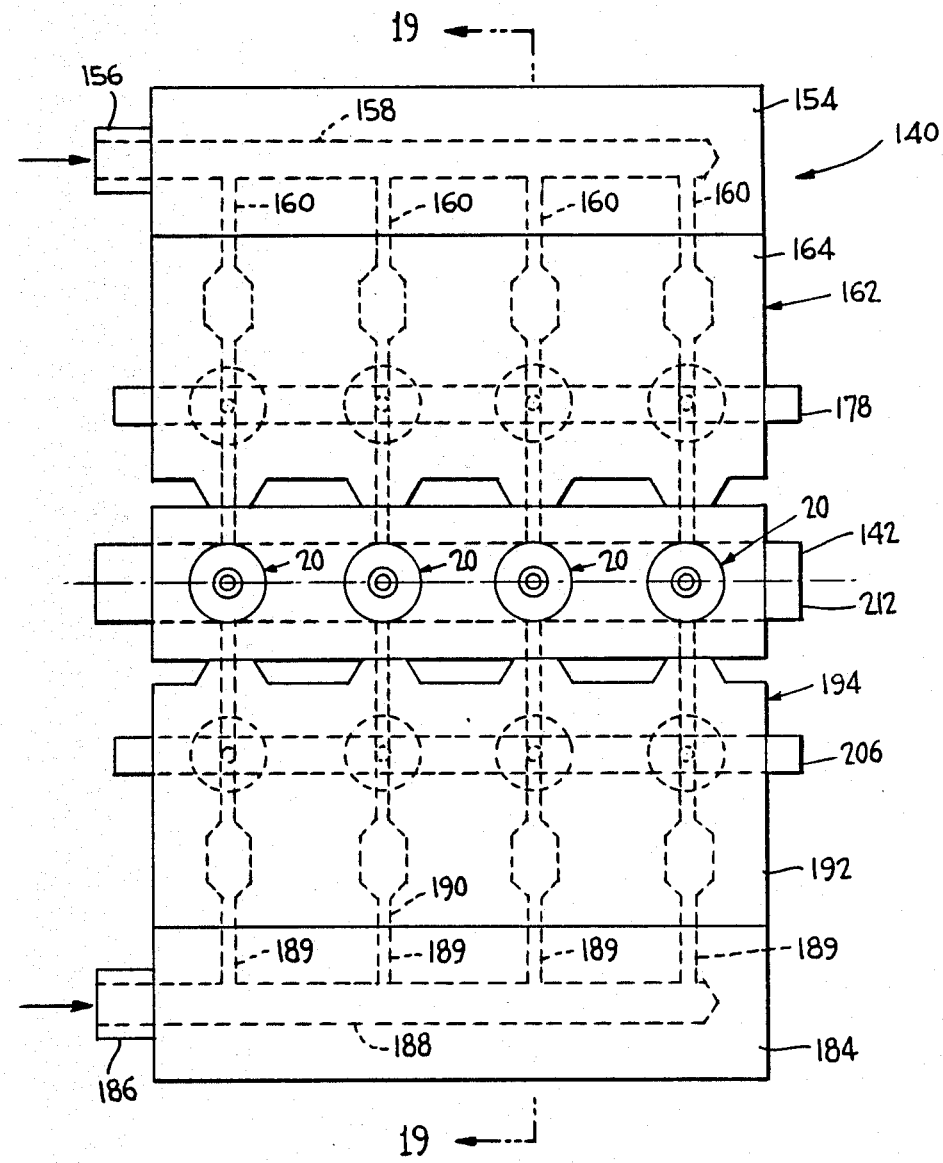
FIG. 18 is a schematic elevational view of an injection mold and valve assembly in accordance with this invention for forming a laminated preform utilizing three different materials.
Figure 19:
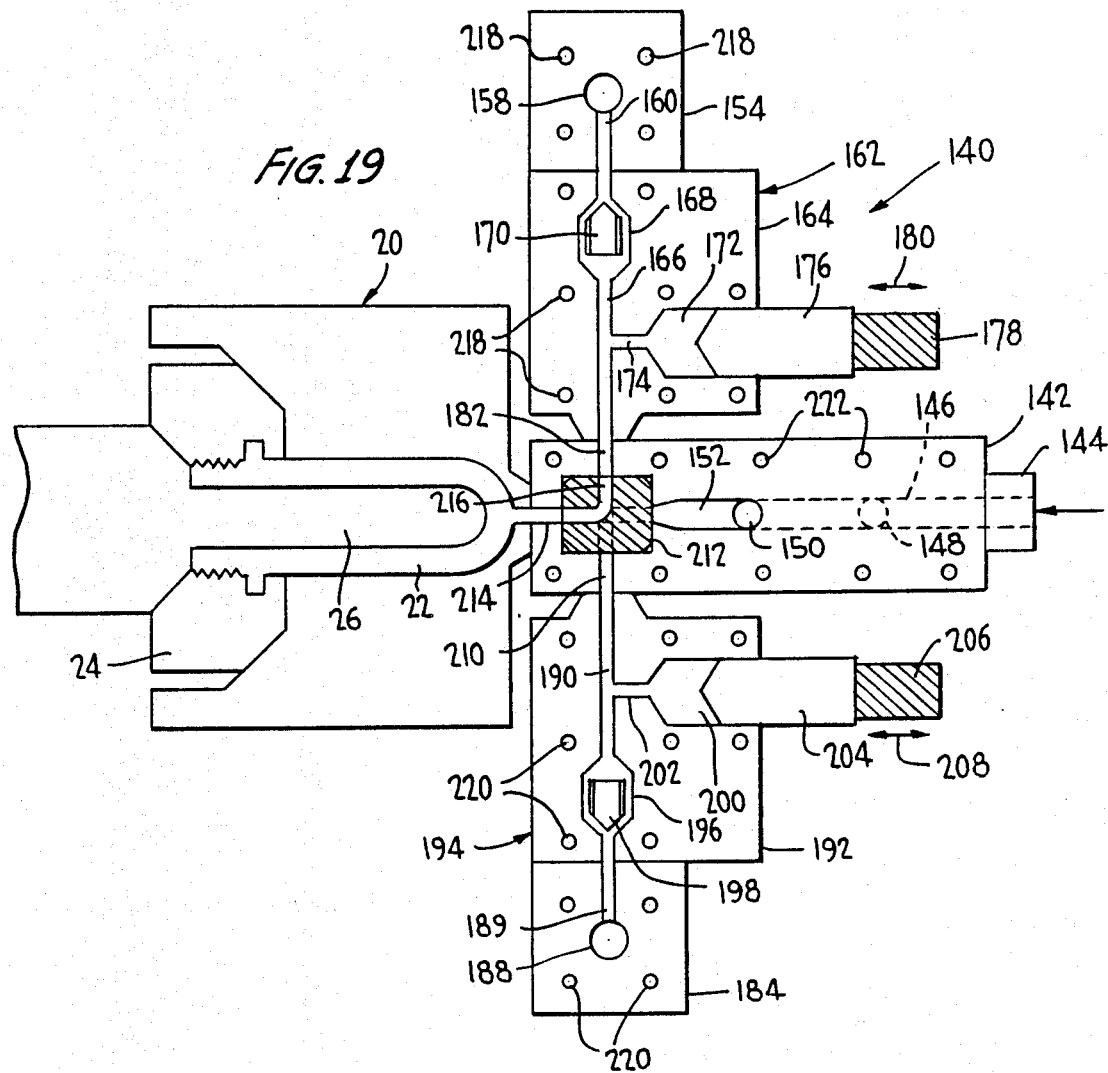
FIG. 19 is a longitudinal vertical sectional view taken generally along the line 19—19 of FIG. 18 and shows specifically the manner in which the three different materials are supplied in sequence to an injection mold for a preform.

Referring now to FIG. 19, it will be seen that there is illustrated an injection molding apparatus 140 associated with the parison forming injection mold 20. The apparatus 140 includes a central flow control member 142 which, as is shown in FIG. 18, is to be simultaneously associated with four of the injection molds 20 for simultaneously injection molding four preforms. It is to be understood that the number of preforms simultaneously injected molded may be increased as is desired and convenient.

The flow control member 142 is provided at the end thereof remote from the injection molds 20 with an inlet member 144 which will be coupled in the normal manner to a conventional plasticizer. The inlet 144 opens into a central passage 146 which, in turn, is in communication with oppositely directed transverse passage 148, 150 which, in turn, will supply a molten plastic material to supply passages 152, there being one supply passage 152 for each of the injection molds 20. The flow control member 142, in effect, is primarily in the form of a manifold.

Above the flow control member 142, depending upon the direction of orientation of the apparatus 140, will be a supply manifold 154 which, as is shown in FIG. 18, will include an inlet 156 for receiving a molten plastic material from another plasticizer. The manifold 154 has a central supply passage 158 which has leading therefrom individual taps or supply passages 160 as is best shown in FIG. 18.

Interposed between the manifold 154 and the flow control member 142 is a metering apparatus generally identified by the numeral 162. The metering apparatus 162 is in the form of a block 164 having extending therethrough a flow passage 166 for each of the passages 160 and forming a continuation thereof. Each of the flow passages 166 is provided with an enlargement 168 adjacent the manifold 154 with there being a check valve 170 mounted within the enlargement for preventing backflow through the flow passage 166 into the associated passage 160.

Between the check valve 170 and the flow control member 142, the block 164 is provided with a metering melt pot 172 for each of the flow passages 166. Each metering melt pot 172 is provided with a flow passage 174 connecting the metering pot 172 to the flow passage 166.

Each metering melt pot 172 is provided with a piston 176 which, in turn, is coupled to an actuator bar 178. It is to be understood that the pistons 176 are all connected to the actuator bar 178 for actuation in unison. The actuator bar 178 is reciprocated in the direction of the arrow 180.

The flow passages 160 are in communication with flow passages 182 in the flow control member 142 for delivering molten plastic material from the manifold 154 into the flow control member 142 to a valve apparatus which will be described in detail hereinafter.

Below the flow control member 142 is another manifold 184 which corresponds to the manifold 154 and which has an inlet 186 (FIG. 18) for receiving yet another molten plastic material from another source, such as a plasticizer.

The manifold 184 has a central supply passage 188 for receiving molten plastic material from the inlet 186 and directing the same in plural streams through passages 189 towards the flow control member 142. It will be seen that the supply passage 188 supplies molten plastic material to a plurality of flow passages 190 formed in a block 192 which corresponds to the block 164 and is part of a metering device generally identified by the numeral 194. There is one flow passage 194 for each of the injection molds 20.

As in the case of the flow passages 166, each flow passage 190 is provided adjacent the manifold 184 with an enlargement 196 in which there is mounted a flow control check valve 198.

Between the check valve 198 and the flow control member 142 there is, for each of the flow passages 190, a metering melt pot 200. Each metering melt pot 200 is in communication with the flow passage 190 by means of a flow passage 202.

Each metering melt pot 200 is provided with a piston 204 with the pistons 204 being kept together by a common actuator bar 206 which is reciprocated in the direction of the arrow 208.

Each flow passage 190 has a continuation flow passage 210 in the flow control member 142 with the flow passages 210 leading to a valve structure.

As is best illustrated in FIG. 19, the flow control member 142 carries a valve member 212 which is in the form of a slide valve. It is, however, to be understood that the valve member could equally as well be a rotary valve.

For descriptive purposes, the flow passages 182 will be desingated as first inlet passages, the flow passages 210 will be identified as second inlet passages, and the flow passages 152 will be designated as third inlet passages. The flow control member 142 will also be provided with a discharge passage 214 which will lead into a respective one of the injection molds 20.

The valve member 212, for each of the sets of inlets passages and discharge passage will be provided with a plurality of valve passages, such as the valve passage 216 for either closing all of the inlet passages 182, 210 and 152 with respect to the discharge passage 214, or for selectively communicating each of the inlet passages with the discharge passage 214 depending upon the position of the valve member 212.

At this time it is pointed out that it is desired to maintain the plastic materials which are to be injected into the mold 20 molten and at a preselected temperature. Accordingly, the manifold 154 and the block 164 are provided with electrical heating elements 218 which are thermostatically controlled to maintain the material supplied to the manifold 154 at a first temperature. It is to be noted that the contact between the block 164 and the flow control member 142 is maintained at a minimum.

In a like manner, the manifold 184 and the block 192 are provided with electrical heating elements 220 which are also, in a conventional manner, thermostatically maintained at a preselected temperature. In order to thermally isolate the manifold 184 and the block 192 from the remainder of the apparatus 140, contact between the block 192 and the flow control member 142 is also maintained at a minimum.

Finally, the flow control member 142 is also provided with a series of electrical heating elements 222 which are thermostatically controlled to maintain the plastic material delivered into the flow control member 142 at a predetermined temperature.

In operation, the discharge passage 214 to the injection cavity port will be closed. The valve member 212 will then be positioned to communicate the inlet passage 182 with the discharge passage 214 and the injection mold cavity 22. When this occurs, the actuator bar 178 will be urged to the left, as viewed in FIG. 19, so as to pump a first molten plastic material into the injection mold cavities 22. The movement of the pistons or plungers 176 will be controlled so that a previously determined accurate amount of the molten plastic material will be directed into the injection mold cavity 22. In accordance with this invention, this first plastic material will preferably be virgin PET.

Next, the valve member 212 will be positioned so as to close the first inlet passages 182 and to open the second inlet passages 210 to the discharge passages 214. At this time, the bar 178 will retract to the right, as viewed in FIG. 19, so as to fill the metering pot 172 with new molten plastic material from the manifold 154.

When the valve 212 is shifted to communicate the second inlet passages 210 with the discharge passages 214, the actuator bar 206 will be urged to the left so as to effect movement of the pistons 204 to the left and to pump molten plastic material supplied by the manifold 184 through the valve 212 and into the respective mold cavities 22. As is in the case of the pistons 176, the pistons 204 will be moved only a certain distance so as to effect a metering pumping of the molten plastic material from the manifold 184 into the mold cavities 22. As described above, this second material will be a suitable plastic barrier material.

After the required barrier material is pumped into the injection mold cavities 22, the valve member 212 will again be shifted to close the second inlet ports or passages 210 and to open the third inlet passages or ports 152 to the discharge passages 214. At this time a third molten plastic material supplied to the flow control member 142 through the inlet 144 will be directed into the mold cavities 22 through the third inlet passages or ports 152. This flow may continue until the mold cavities 22 are filled.

The molten plastic material which is supplied through the inlet 144 may be of any suitable character with it being envisioned that the molten plastic material will be a regrind of salvaged PET or like thermoplastic resin from previously formed containers. It is envisioned that previously formed containers including barrier layers of the type disclosed hereinabove may be beneficially utilized.

Figure 20:
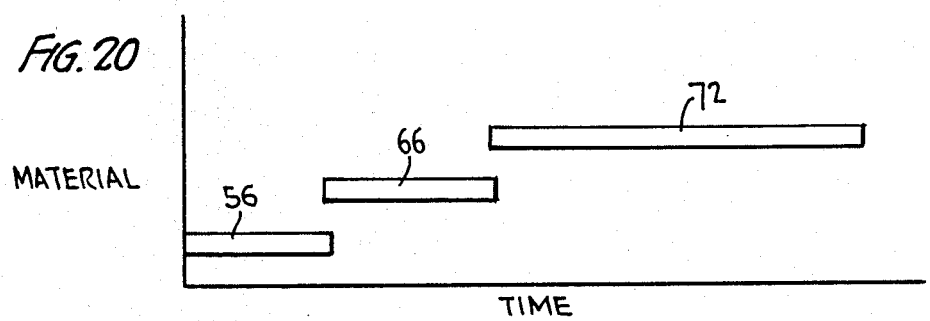
FIG. 20 is a diagram plotting the injection of the materials into the mold cavity against time utilizing the apparatus of FIGS. 18, 19.

Referring now to FIG. 20, it will be seen that in accordance with the flow diagram illustrated therein the general timing of the injection of the melted plastic material will be the same as that shown in FIG. 6. The preferred thermoplastic resin 56, for example PET, is first injected into the injection mold cavity 22 through the first inlet passage 182. This is followed by injection of the barrier material 66 into the injection mold cavity 22 through the second inlet passage 210. Finally, the thermoplastic resin 72, which will be different from the thermoplastic resin 56, will be directed into the cavity 22 through the third inlet passage 152.

It is to be particularly understood that the injection of the various molten plastics will be sequential although there can be a slight overlap at the end of one injection cycle and the beginning of the next following injection cycle so as to positively avoid any voids in the flow of molten plastics into the cavity 22.

Figure 21:
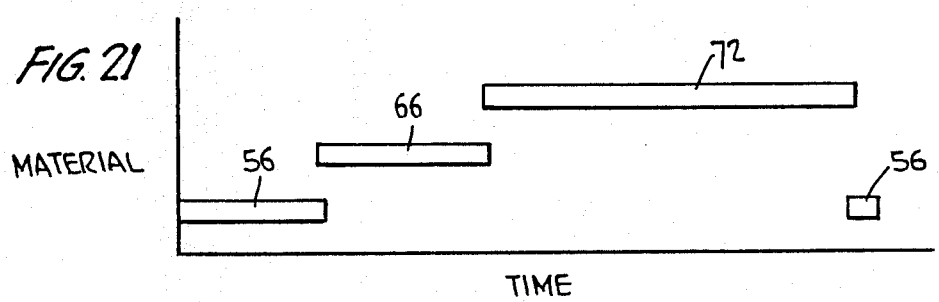
FIG. 21 is another diagram plotting the injection of the materials into a mold cavity against time with a slightly different injection sequence.

Reference is now made to FIG. 21 wherein there is illustrated a slightly modified flow diagram. As in the case of the flow diagram of FIG. 20, the thermoplastic resin 56 will be first injected into the mold cavity followed by the injection of the barrier material 66. Then the regrind material or other thermoplastic resin 72, which will be different from the thermoplastic resin 56, will be injected into the mold cavity substantially filling the cavity 22. This will be followed by another injection of the thermoplastic resin 56 so that none of the thermoplastic resin 72 will remain in the system to be injected into the next following mold cavity. For example, it is necessary that the discharge passage 214 be filled with the thermoplastic resin 56 at the time of the completion of the injection molding cycle to assure that the inner and outer first layers 58, 60 will be formed solely of the thermoplastic resin 56.

Although specific materials have been described as being beneficially acceptable, it is to be understood that the possibilities of utilizing barrier materials which are not commercially acceptable at this time definitely exist because of the ability to maintain the thickness of the barrier material layers in the blow molded article one which provides for the desired barrier characteristics without utilization of an excess amount of the otherwise prohibitively expensive material.

Although only several preferred embodiments of the invention have been specifically illustrated and described herein, it is to be understood that material layers within the preforms may be varied in accordance with the desired uses of the preforms and the resultant blow molded articles.

We claim:

1. Apparatus for forming a laminated preform having inner and outer first layers, inner and outer second layers within said first layers, and an innermost third layer, said apparatus comprising a conventional preform forming injection mold unit including a mold element and a cooperating core defining a mold cavity, at least one supply of thermoplastic resin under pressure and a separate supply of barrier material under pressure, a valve between said supplies and said mold unit, and means for actuating said valve in sequence to admit first a preselected quantity of thermoplastic resin to said mold cavity to form said first layers, then a preselected quantity of barrier material to said mold cavity to form said second layers, and finally more thermoplastic resin to said mold cavity to at least form said third layer.

2. Apparatus according to claim 1 wherein there is only one supply of thermoplastic resin and said means for actuating said valve in sequence is operable to supply said more thermoplastic resin from said one supply of thermoplastic resin.

3. Apparatus according to claim 1 wherein there are two supplies of thermoplastic resin and said means for actuating said valve in sequence is operable to supply said more thermoplastic resin from a second of said two supplies.

4. Apparatus according to claim 1 wherein there are two separate supplies of said thermoplastic resin, said valve has a first inlet port coupled to a first of said two separate supplies of thermoplastic resin, a second inlet port coupled to said supply of barrier material, and a third inlet port coupled to a second of said two separate supplies, and said valve has flow control means for separately coupling each of said inlet ports to said mold unit.

5. Apparatus according to claim 4 wherein there is associated with each of said valve inlet ports a supply manifold, and said supply manifolds each having a separate temperature control system.

6. Apparatus according to claim 4 wherein there is associated with each of said valve inlet ports a supply manifold, and there being between said supply manifolds and said valve first and second inlet ports separate metering pots for controlling the volume of thermoplastic resin and barrier material supplied respectively to said first and second inlet ports.

7. Apparatus according to claim 6 wherein there is a check valve between each of said metering pots and a respective one of said manifolds for preventing return flow during the actuation of each of said metering pots.

8. Apparatus according to claim 6 wherein said supply manifolds each have a separate temperature control system.

9. Apparatus according to claim 8 wherein said manifolds are thermally isolated from one another.

10. Apparatus according to claim 5 wherein said manifolds are thermally isolated from one another.

11. Apparatus according to claim 4 wherein the operation sequence of said valve: closed; open to said first port; open to said second port; open to said third port; open to said first port; and closed.

* * * * *